Inventor:
Carl Oscar Josef Montelius
by
Attorneys

Patented June 15, 1943

2,321,696

UNITED STATES PATENT OFFICE 2,321,696

SCREW ROTOR

Carl Oscar Josef Montelius, Stockholm Sweden, assignor to Aktiebolaget Imo-Industri, Stockholm, Sweden, a corporation of Sweden Application July 23, 1941, Serial No. 403,669 In Sweden February 6, 1940

4 Claims. (Cl. 74—466)

My present invention refers to an improvement in machines for transfer of power to or from a gas or steam, which machines include at least two rotatable members, or rotors, provided with screw threads engaging each other, one of said rotors having screw threads provided with convex side faces whereas the other is provided with screw threads having correspondingly concave side faces. Machines of this kind are commonly used as compressors, and therefore they are usually termed "screw compressors," but naturally they may also be used as motors.

The invention consists in a specific shape of the cooperating screw faces on the rotors and differs from screw rotors previously known in the art in respect to the cross sectional shape of the threads for the purpose specified in detail in the following.

Figure 1:
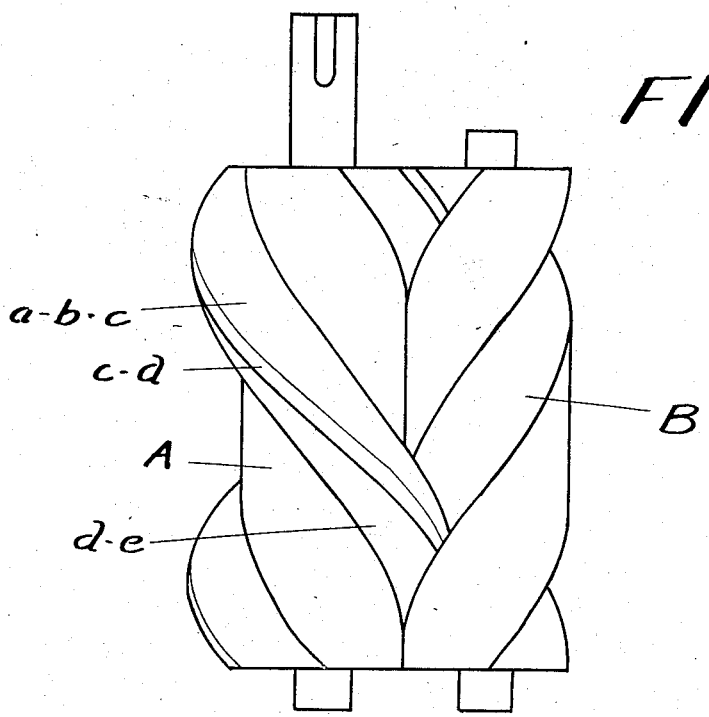
Figure 2:
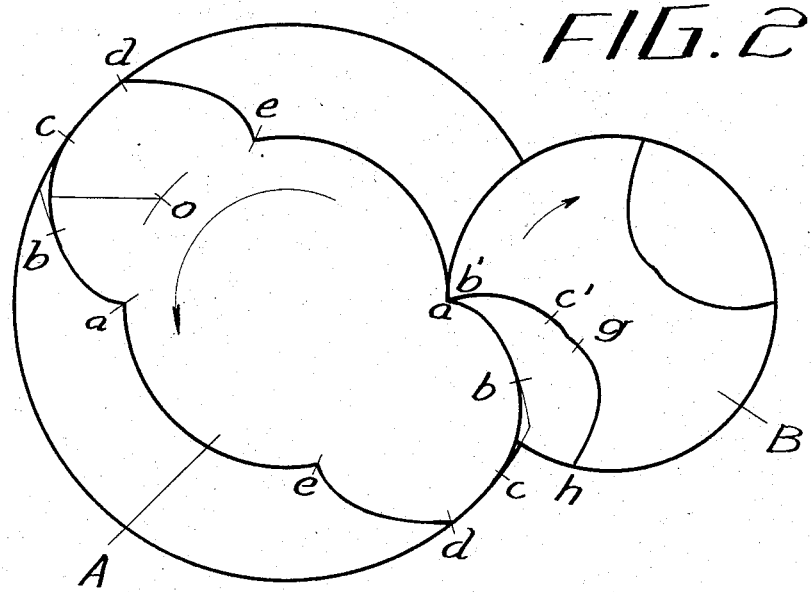

An embodiment of the invention applied to double-threaded rotors is described in the following with reference to the accompanying drawing, in which Fig. 1 shows a coacting pair of rotors in side elevation, whereas Fig. 2 is drawn at a greater scale and shows an end view of the same pair of rotors.

Since the type of the machine and the principle of function of the same are well known, it is unnecessary to describe the same in detail, but it may be stated that one of the two coacting rotors has thread faces of convex shape whereas the other has correspondingly concave thread side faces, and that the outer cylindrical surfaces of the threads fit snugly to the interior of a casing (not shown) enclosing both of the rotors, so that the inner surface of said casing together with the side faces of the threads and the bottom surfaces of the thread grooves form substantially closed chambers travelling axially from the one end of the casing to the other during the rotation of the screw rotors.

In order to obtain the highest efficiency in running of machines of the type here concerned, it is of vital importance to provide for a continuous, i. e. unbroken, contact or tightening line between the rotors at the rear end of the axially travelling working chambers considered from the standpoint of in the direction of travel of the same.

It ought perhaps to be stated that the term "tightening line" or "contact line" is not necessarily to be understood as requiring that the rotors should be actually in touch with each other at such line, but on the contrary the said terms also include the presence of a certain play which from mechanical or constructional points of view sometimes, or perhaps most frequently, must be at hand, in which case the said play shall be as small as possible, however.

In order to prevent an unnecessary leakage lowering the efficiency of the machine in running, it is the object of the invention to provide for an advantageous tight fit between the rotors, and simultaneously to arrive at a sturdy shape of the threads, reliable even at high running speed. In this connection, I mean with high speed up to 10,000-20,000 R. P. M. It will easily be understood that even if an actual contact should be at hand at the "tightening line" from the outset, such contact will rather soon be eliminated, when the rotors are coupled together with a toothed gear as usual.

As indicated in the foregoing, one of the rotors has substantially convex thread side faces, whereas the other has substantially concave side faces of the threads, and the characteristic of the invention is that the main part of the side faces of the threads of the rotor having the convex thread side faces is generated by the outer edge lines of the threads on the coacting rotor having concave thread side faces, and that in each of the convex threads the outer portion of the one side is circularly arc-shaped in cross section, whereas the rotor having concave ridge sides in a manner known per se is shaped, with or without actual touch, to fit against the thread sides on the first mentioned rotor, so that a "tightening line" is obtained, which is continuous (unbroken) and follows both the outer edge lines of the rotor threads and also the circularly arc-shaped portion of the cross section.

In the drawing, A is the rotor provided with convex thread faces, and B is the coacting rotor having concave thread faces. The cross sectional shape of the threads will be understood from Fig. 2. The rotor A has threads the cross section of which is defined at both sides by epicycloids between the points $a$ and $b$, and between $d$ and $e$, respectively, these portions of the section being generated by the edge points (or lines) $b^1$ and $h$ of the concave threads on the rotor B. According to the invention, the point $b$ is not located on the periphery of the rotor A, however, but it is located at a distance therefrom and nearer the centre, and from the point $b$ the cross section is defined by a circular arc to a point $c$ located on the periphery of the rotor. The point $c$ may coincide with the point $d$ but preferably it is located at a distance therefrom, and for obtaining a more sturdy construction of the thread, the cross section between the points c and d is defined by a circular arc having the same centre as the rotor and coinciding with the periphery of the latter. The centre o of the circular arc b—c is located on the core circle, or rolling circle, of the rotor A.

According to Fig. 1, the thread will then at one side be confined by a surface a—b—c corresponding to the points having the same references in Fig. 2, a cylindrical top face c—d (the thin line in Fig. 1 is incorrectly drawn from a draftsman's point of view, and it is drawn to define the last-mentioned top face only), and an opposite side face d—e, both of these last-mentioned faces also corresponding to the points having the same references in Fig. 2.

If the machine shall act as a compressor, the coacting rotors shall have the directions of rotation indicated by arrows in Fig. 2, so that the rounded off top edges of the rotor A having the convex threads shall travel first in the direction of rotation, and if the machine shall act as motor, the directions of rotation shall be reversed.

The coaction of the threads when running will be the following when considering the cross section of the same:

The point $b^1$ (and corresponding edge) slides first over the side a—b, and when the point $b^1$ reaches the point b, the arc $b^1$—$c^1$ (apart from play) will contact with the arc b—c, whereafter the cylindrical groove face $c^1$—g rolls over the cylindrical face c—d and slides somewhat in relation thereto due to difference in peripheral speed. Already previously the point d (or corresponding edge) has slid over the face g—h whereupon the said point h slides over the face d—e. Herefrom it will be apparent that a continuous (unbroken) "tightening line" will be obtained, and the convex threads on the rotor A do not show any sharp edges between different portions of the profile.

What I claim and desire to secure by Letters Patent is:

1. A mechanism of the type described comprising a pair of interengaging screw rotors, one of said rotors being provided with threads having convex side faces and the other of said rotors being provided with threads having concave side faces, the inner part of one thread side face and the whole of the opposite thread side face of each thread of the first rotor comprising surfaces generated by the outer edges of the threads of the second rotor during uniform relative rotation of the rotors, the remaining outer part of the first mentioned thread side face of the first rotor having, in every cross-section taken perpendicular to its axis of rotation, a circular arc profile, and the concave side faces of the threads of the second rotor comprising surfaces fitting the threads of the first rotor during uniform relative rotation of the rotors.

2. A mechanism of the type described comprising a pair of interengaging screw rotors, one of said rotors being provided with threads having convex side faces and the other of said rotors being provided with threads having concave side faces, the inner part of one thread side face and the whole of the opposite thread side face of each thread of the first rotor comprising surfaces epicycloidal in cross-sections taken perpendicular to its axis of rotation and generated by the outer edges of the threads of the second rotor during uniform relative rotation of the rotors, the remaining outer part of the first mentioned thread side face of the first rotor having, in every cross-section taken perpendicular to its axis of rotation, a circular arc profile, and the concave side faces of the threads of the second rotor comprising surfaces fitting the threads of the first rotor during uniform relative rotation of the rotors.

3. A mechanism of the type described comprising a pair of interengaging screw rotors, one of said rotors being provided with threads having convex side faces and the other of said rotors being provided with threads having concave side faces, the inner part of one thread side face and the whole of the opposite thread side face of each thread of the first rotor comprising surfaces generated by the outer edges of the threads of the second rotor during uniform relative relation of the rotors, the remaining outer part of the first mentioned thread side face of the first rotor having, in every cross-section taken perpendicular to its axis of rotation, a circular arc profile having its center located in the rolling circle of the first rotor, and the concave side faces of the threads of the second rotor comprising surfaces fitting the threads of the first rotor during uniform relative rotation of the rotors.

4. A mechanism of the type described comprising a pair of interengaging screw rotors, one of said rotors being provided with threads having convex side faces and the other of said rotors being provided with threads having concave side faces, the inner part of one thread side face and the whole of the opposite thread side face of each thread of the first rotor comprising surfaces generated by the outer edges of the threads of the second rotor during uniform relative rotation of the rotors, the remaining outer part of the first mentioned thread side face of the first rotor having, in every cross-section taken perpendicular to its axis of rotation, a circular arc profile, and each thread of the first rotor having a cylindrical outermost portion concentric with its axis of rotation.

CARL OSCAR JOSEF MONTELIUS.